(12) United States Patent
Schroll

(10) Patent No.: US 8,322,471 B2
(45) Date of Patent: Dec. 4, 2012

(54) ANGULAR MOMENTUM TORQUE ENHANCEMENT FOR SPHERICAL VEHICLES

(76) Inventor: Gregory C. Schroll, Fort Collins, CO (US)

( * ) Notice: Subject to any disclaimer, the term of this patent is extended or adjusted under 35 U.S.C. 154(b) by 315 days.

(21) Appl. No.: 12/619,582

(22) Filed: Nov. 16, 2009

(65) Prior Publication Data

US 2010/0122859 A1    May 20, 2010

Related U.S. Application Data

(60) Provisional application No. 61/115,097, filed on Nov. 16, 2008.

(51) Int. Cl.
*B60K 8/00* (2006.01)
(52) U.S. Cl. ........ 180/54.1; 180/7.1; 446/443; 446/458; 446/462; 74/5.2; 74/5.22; 74/5.4
(58) Field of Classification Search ............. 446/443, 446/458, 462; 74/5.22, 5.4, 5.2; 180/7.1, 180/54.1
See application file for complete search history.

(56) References Cited

U.S. PATENT DOCUMENTS

| | | | |
|---|---|---|---|
| 3,798,835 A | | 3/1974 | McKeehan |
| 6,227,933 B1 * | | 5/2001 | Michaud et al. ............ 446/462 |
| 6,289,263 B1 | | 9/2001 | Mukherjee |
| 2008/0047375 A1 | | 2/2008 | Sonoura |
| 2008/0097644 A1 * | | 4/2008 | Kaznov et al. ............ 700/245 |
| 2009/0064805 A1 * | | 3/2009 | Naumov et al. ............ 74/5.22 |

OTHER PUBLICATIONS

International Search Report for PCT/US09/064647, International Searching Authority, Jan. 12, 2010, pp. 1-8.

* cited by examiner

*Primary Examiner* — Lesley D Morris
*Assistant Examiner* — Jacob Knutson
(74) *Attorney, Agent, or Firm* — Samuel M. Freund; Cochran Freund & Young LLC

(57) ABSTRACT

An apparatus and method are described for utilizing internally generated angular momentum for supplementing the propulsion of a mobile spherical vehicle capable of motion by rolling over terrain, thereby enabling such vehicles to climb steeper inclines and overcome larger obstacles. Torque generated by counter-rotating gyroscopes was used to supplement gravity generated torque produced by a pendulum drive propulsion system. Precession torque may be generated along a desired axis by changing the angular momentum of the gyroscopes while leaving its magnitude unaffected.

18 Claims, 14 Drawing Sheets

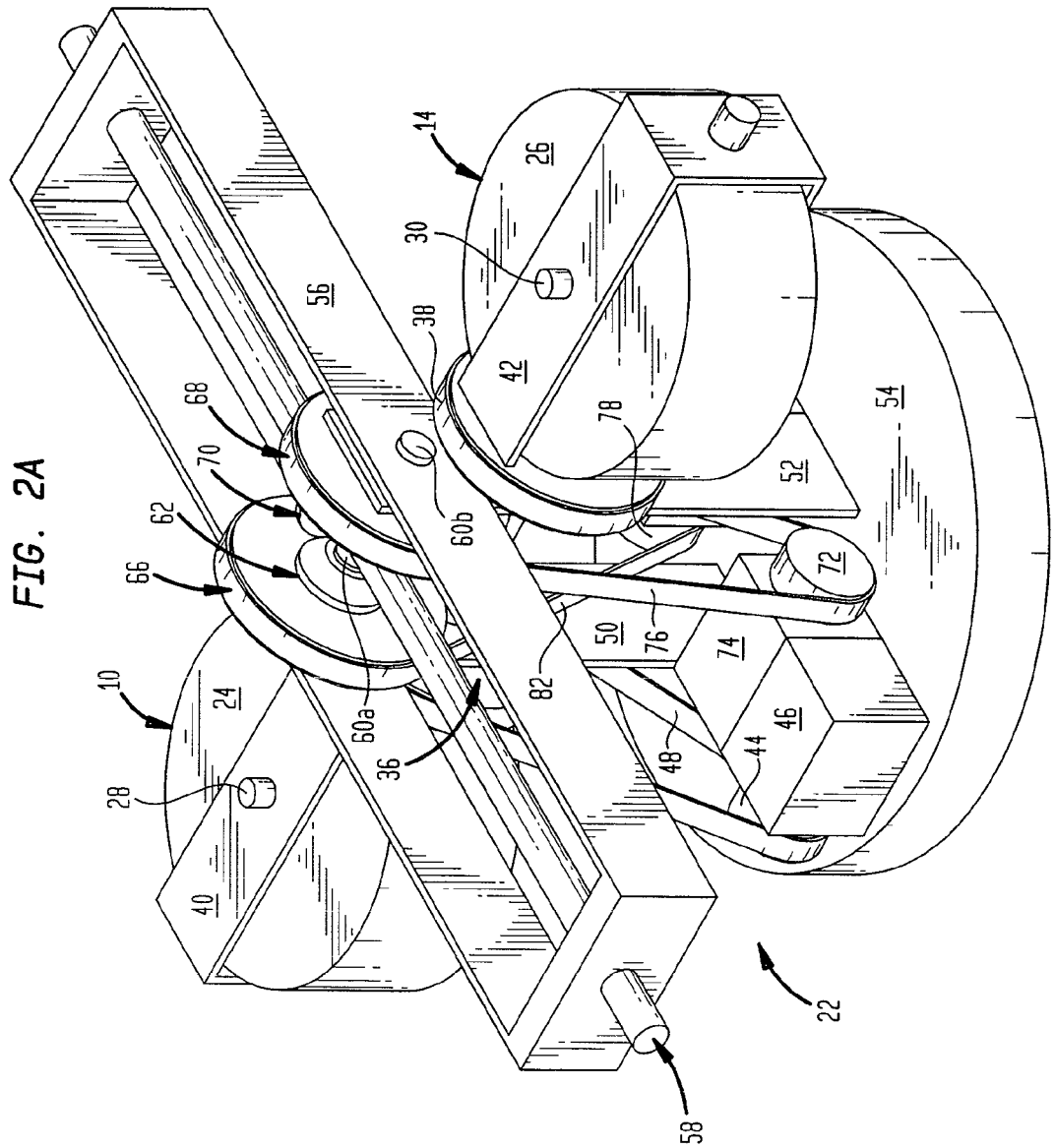

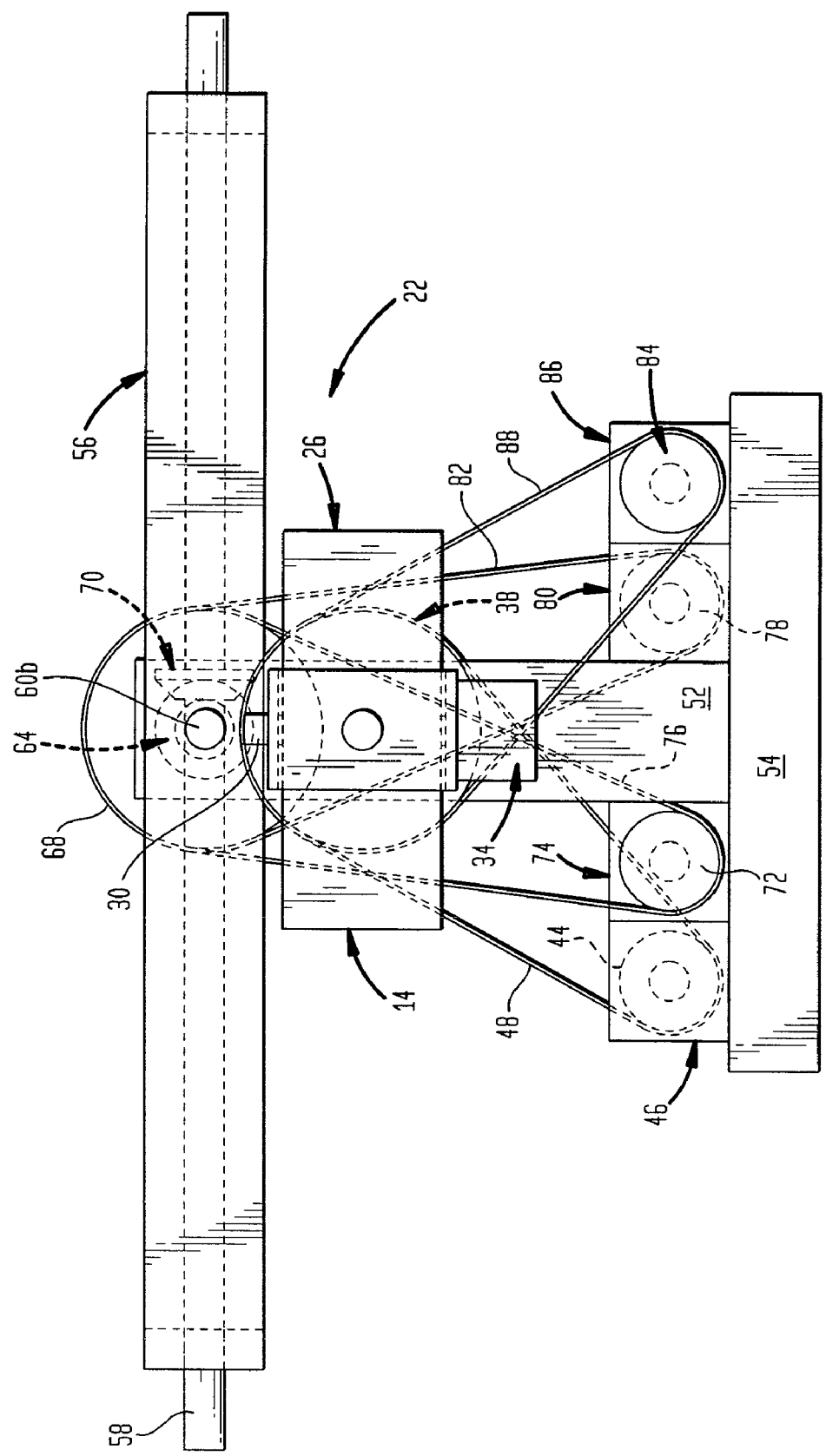

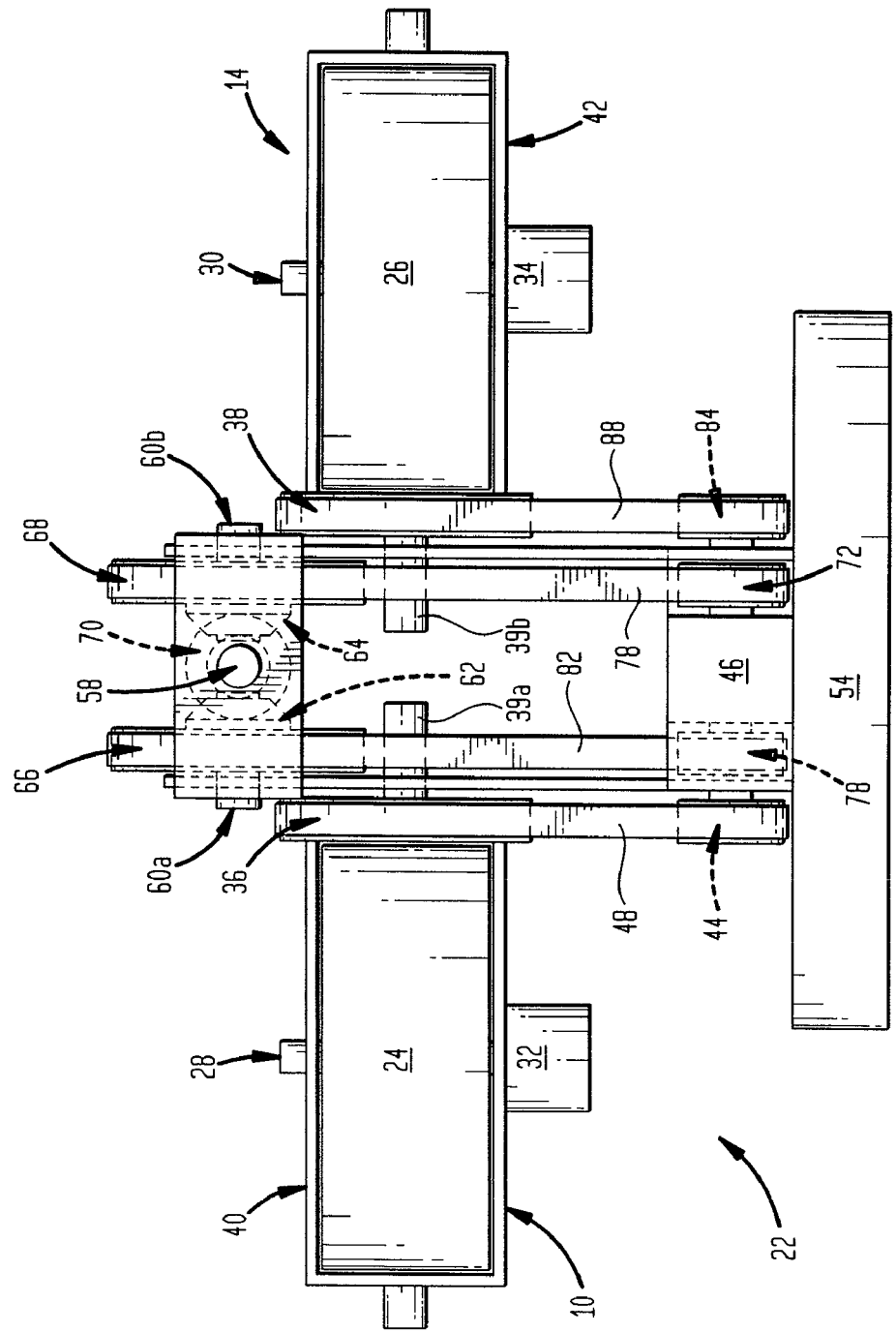

ANGULAR MOMENTUM TORQUE ENHANCEMENT FOR SPHERICAL VEHICLES

RELATED CASES

The present application claims the benefit of provisional patent application Ser. No. 61/115,097 for "Angular Momentum Storage For Enhancing the Torque Capabilities of Spherical Vehicles" by Gregory C. Schroll, filed on 16 Nov. 2008, which provisional application is hereby incorporated by reference herein for all that it discloses and teaches.

FIELD OF THE INVENTION

The present invention relates generally to spherical vehicles capable of locomotion using an internal propulsion mechanism which shifts the center of mass, thereby disturbing the equilibrium of the vehicle and, more particularly, to a spherical vehicle which employs stored angular momentum for augmenting the torque created by shifting the center-of-mass of the vehicle.

BACKGROUND OF THE INVENTION

A mobile land vehicle capable of traversing a wide variety of difficult terrain while remaining difficult to disable is an attractive concept for many applications including search and rescue operations, reconnaissance missions, sentry duty, and planetary exploration. A spherical vehicle in which the outer surface is the driving surface and using internal mass shifting as a method of propulsion, has great potential for such applications since it is always right side up, and the shell protects the components, all of which are located inside. However, such vehicles are limited in their acceleration and in their ability to ascend inclines, and climb over obstacles.

Pendulum-type ball robots comprising a main axle diametrically connected to the shell of a ball and supporting a drive mechanism adapted to drive a weighted pendulum for rotation around the main axle are known. With the center of mass below the center of the ball, torque can be applied to the main shaft or axle to tilt the pendulum forward, thereby shifting the center of mass in a forward direction. On a level surface, this action moves the center of mass in front of the sphere's contact point with the ground, causing the ball to roll forward as a result of gravitational forces. By continuously maintaining the pendulum at an angle, thrust may be provided, thereby enabling the sphere to roll continuously.

Tilting the pendulum in a backwards direction will cause the sphere to move backwards, while tilting the pendulum to one side while the sphere is moving forward or backward will cause the sphere to travel in an arc to the left or right. Since the drive mechanism interfaces with the shell at two places, the internal and external surface dimensions of the shell are not critical, permitting the shell to be constructed in several ways and provide compliance for shock absorption.

Propulsion by shifting the center-of-gravity of a spherical vehicle to cause it to roll places limitations on the vehicle's ability to ascend inclines and overcome obstacles, limited by optimization of the placement of the mass, and how much the center-of-gravity can be shifted internally. U.S. Patent Publication No. 2008/0097644 for "Ball Robot" published on 24 Apr. 2008, describes a ball robot which lowers the center of mass of the vehicle by hanging the driving unit(s) on at least one pendulum as close to the inner surface of the shell of the robot as possible, and states that from a stopped condition, obstacles can be traversed if their height is less than about 25% of the radius of the ball, and that the ability to traverse such an obstacle is proportional to the ratio between the distance from the center of the sphere to the center of mass, to the sphere radius.

Such limitations may have prevented spherical vehicles from achieving the importance expected from their un-invertible characteristic in that they may become stuck in shallow valleys, or stopped by small obstacles.

SUMMARY OF THE INVENTION

Accordingly, it is an object of embodiments of the present invention to provide a spherical vehicle capable of providing increased torque over spherical vehicles utilizing pendulums effective solely for internally moving the center-of-mass of the vehicle as a mechanism for propulsion.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the spherical vehicle, hereof, includes: a spherical shell; an axle connected to the shell and disposed interior thereto along a diameter; a pendulum pivotably coupled to the axle; a transmission for driving the pendulum comprising a first drive motor and a second drive motor; a first gyroscope disposed on the pendulum; a second gyroscope disposed on the pendulum, the first gyroscope and the second gyroscope being effective for generating torque between the pendulum and the axle; a third motor for tilting the first gyroscope; and a fourth motor for tilting the second gyroscope.

In another aspect of the present invention, and in accordance with its objects and purposes, the method for driving a spherical vehicle hereof includes the steps of: providing a spherical shell having an axle disposed interior thereto and connected thereto along a diameter; shifting the center-of-gravity of a pendulum pivotably coupled to the axle such that torque is generated between the pendulum and the axle effective for rotating the axle; tilting a first gyroscope disposed on the pendulum, relative to a second gyroscope disposed on the pendulum, wherein the first gyroscope and the second gyroscope are effective for generating torque between the pendulum and the axle, thereby augmenting the torque generated in the step of shifting the center-of-gravity effective for rotating the axle; and shifting the center-of-gravity of the pendulum such that torque is generated between the pendulum and the axle effective for rotating the pendulum longitudinally to the axle.

Benefits and advantages of embodiments of the present invention include, but are not limited to, providing a spherical vehicle capable of generating sufficient torque to overcome large obstacles and to climb steep inclines.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2A is a schematic representation of a perspective view of one embodiment of the pendulum drive apparatus hereof, showing two of the six motors, the counter-rotating control moment gyroscopes, a portion of the differential drive, the main drive shaft for the spherical vehicle, the pendulum base, and the pendulum hanger apparatus; FIG. 2B is a schematic representation of a front view of the pendulum drive shown in FIG. 2A hereof, illustrating one of the driving motors for the control moment gyroscopes, the pendulum swing and tilt motors, and the tilting motors for the control moment gyroscopes; FIG. 2C is a schematic representation of an side view of the pendulum drive apparatus shown in FIG. 2A hereof, showing both drive motors for the control moment gyroscopes, the tilting pulleys therefor, and the miter gear differential drive for the pendulum.

FIG. 6A is a schematic representation of a perspective view of another embodiment of the control moment gyroscope, illustrating a solid flywheel and two-axis tilting, while

FIG. 8A is a schematic representation of a perspective view of a two-pendulum embodiment of the pendulum drive hereof, illustrating the counter-rotating control moment gyroscopes on one pendulum, while

DETAILED DESCRIPTION OF THE INVENTION

Figure 1:
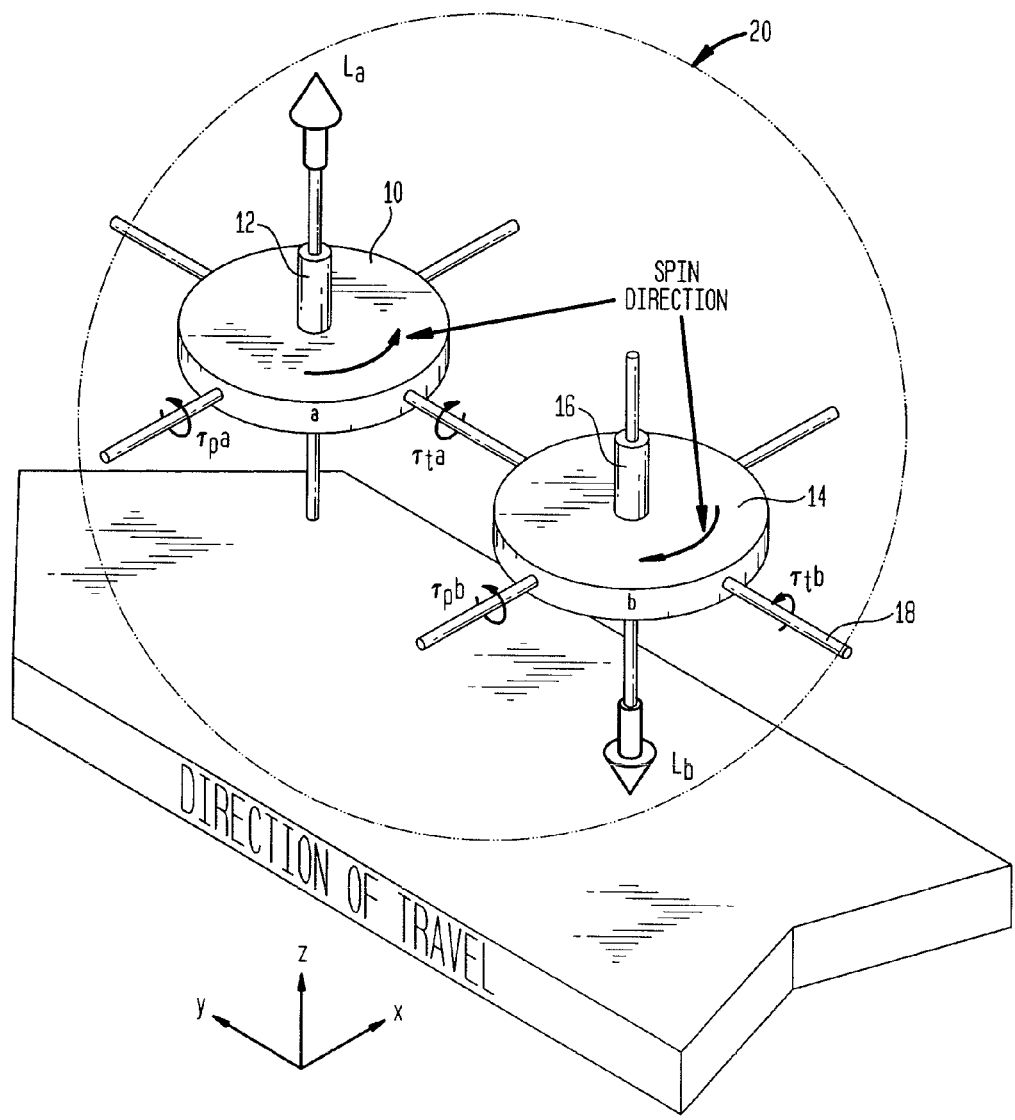
FIG. 1 is a diagram showing an apparatus for momentum storage using two, counter-rotating control moment gyroscopes.

Briefly, embodiments of the present invention includes an apparatus and method for utilizing internally generated angular momentum for supplementing propulsion of a mobile spherical vehicle capable of motion by rolling over terrain, thereby enabling such vehicles to climb steeper inclines and overcome larger obstacles. Torque generated by counter-rotating gyroscopes was used to supplement gravity generated torque produced by a pendulum drive propulsion system. Precession torque may be generated along a desired axis for forward or back motion of the sphere by changing the direction of the angular momentum of the gyroscopes while leaving its magnitude unaffected. A gyroscope, including a flywheel, a housing and a drive motor, when tilted about an axis perpendicular to its spin axis, as described hereinbelow, is commonly referred to as a control moment gyroscope or CMG.

Gyroscopic precession for CMGs is governed by the following equations:

$$\tau = dL/dt,$$

$$L = I\omega, \text{ and}$$

$$E_{kinetic} = \frac{1}{2} I \omega^2,$$

where $\tau$ is torque, L is the angular momentum, I is the moment of inertia, $\omega$ is the angular velocity, and E is the kinetic energy. From the first of these equations, it is seen that torque is the time rate of change of angular momentum. The angular momentum of a flywheel is a vector quantity and is a function of the moment of inertia of the flywheel and its angular velocity. The kinetic energy of the flywheel is a scalar quantity, and is a function of the moment of inertia and the square of the angular velocity. This leads to the effectiveness of a CMG for use in the present invention. A torque can be applied to change the direction of the angular momentum, without changing the rotational kinetic energy.

Spherical vehicle drive systems employing the mass-shifting principle may include a spherical shell having a diametrical drive shaft which together have a center-of-mass located nominally at the center of the sphere, and a hanging pendulum pivotably mounted to the drive shaft and having its center of mass away from the center of the sphere. Gravity acts on both the sphere and the pendulum as a force acting downwards on each of the centers of mass. When at rest on level ground, the force on the center of mass of the spherical shell is directed downward passing through the contact point between the spherical shell and the ground. An upward normal force at the contact point is equal and opposite to the gravitational force, resulting in zero net force and zero net torque on the spherical shell unit.

Gravity also acts on the mass of the pendulum with a downward force at its center-of-mass. When the sphere is at rest on level ground gravity tends to orient the pendulum in a downward direction, resulting in zero net force and zero net torque on the pendulum. When the pendulum is oriented at some angle to the vertical, the downward force from gravity coupled with a normal force pushing up on the pendulum at the pivot point on the drive shaft, generates a torque on the pendulum. This torque acts as a restoring torque which attempts to reorient the pendulum downward towards the earth. The maximum restoring torque from gravity is generated when the moment arm between the center-of-mass and the pivot point is largest which occurs when the pendulum is at 90° to the vertical. Rotating the pendulum past 90° shortens the moment arm, thereby decreasing the restoring torque.

A drive motor may be attached to the pendulum for applying torque between the pendulum and the drive shaft connected to the spherical shell. The restoring torque on the pendulum counteracts the torque from the motor, which results in a net drive torque on the drive shaft and spherical shell, propelling the sphere forward. If the resulting drive torque exceeds the maximum restoring torque from gravity, the pendulum will rotate past 90°, which would not result in sustained forward motion of the sphere and likely cause the sphere to behave unstably.

As described hereinabove, a spherical shell experiences zero net force and zero net torque while on level ground. When on an incline, the contact point with the ground is no longer directly below the center of mass of the spherical shell unit, creating a non-zero moment arm. The force due to gravity, coupled with the normal force between the ground and the spherical shell generates a torque on the spherical shell unit tending to make it roll down the incline. For there to be a positive net torque propelling the spherical vehicle up the incline the torque generated by gravitational forces is exceeded by torque generated by the pendulum with the attached drive motor. From geometrical considerations, the maximum incline that a spherical vehicle may climb continuously is given by the equation, $$\theta = \sin^{-1}(r/R),$$

where $\theta$ is the angle of the incline, R is the radius of the spherical vehicle, and r is the distance from the center of the sphere to the center-of-mass of the entire spherical vehicle. This equation is derived from the configuration where the contact point between the spherical shell and the incline is directly below the center-of-mass of the spherical vehicle at its forward most position when the pendulum is at 90° to the vertical. From this equation it is clear that maximizing the ratio r/R will maximize the incline angle. Practical limitations render it difficult to construct a spherical vehicle having a ratio r/R much greater than about ½, which leads to a maximum incline of about 30°.

When climbing straight up a constant incline, the trajectory of the sphere is a straight line parallel to the incline. A sphere climbing over an obstacle may be described in a similar manner. An obstacle may be represented as a rectangular step having a height less than the radius of the spherical vehicle. The most difficult starting condition for climbing over an obstacle is when the spherical vehicle is starting from rest on level ground, and touching the corner of the step obstacle at one point. At the moment the sphere begins climbing the step, its instantaneous trajectory is the same as an incline tangent to the sphere at the contact point between the spherical shell and the corner of the step obstacle. The maximum relative height of a step that a spherical vehicle can climb under these starting conditions is given by the equation, $$\frac{h}{R} = 1 - \sqrt{1 - \left(\frac{r}{R}\right)^2},$$

where h is the height of a step obstacle, R is the radius of the spherical vehicle, and r is the distance from the center of the sphere to the center of mass of the entire spherical vehicle. For a ratio of r/R=½, the ratio h/R is about 13%. For example, a spherical vehicle having a diameter of 12 in. would be unable to climb over an obstacle higher than 0.8 in. starting from rest.

As stated, spherical vehicle designs employing only the principle of mass shifting have limitations in drive torque, preventing such devices from being useful in rough mobile applications. Embodiments of the present invention include auxiliary mechanisms for applying greater driving torque over that of the mass shifting principle, thereby enabling a spherical vehicle to temporarily generate several times more torque than by using mass-shifting alone. This controlled boost in torque enables a spherical vehicle to climb finite steep inclines, and over obstacles having heights approaching the radius of the sphere.

An auxiliary mechanism which enables a spherical vehicle to temporarily generate sufficient torque to climb inclines approaching 90° and to climb over obstacles of a height approaching the radius of the spherical vehicle, assuming effective traction or some positive engagement with the terrain is available to allow it, incorporates a pair of control moment gyroscopes (CMGs) attached to the pendulum in a configuration which has a net zero angular momentum. When rotating at high speeds, the flywheel in each of the CMGs stores a significant quantity of angular momentum. The pair of CMGs are oriented such that their angular momentum vectors are equal in magnitude and pointed in opposite directions, resulting in zero net angular momentum for the pair. When held in this net zero angular momentum configuration relative to each other, the pair can change orientation as a unit relative to an inertial reference frame without generating adverse gyroscopic effects, which would otherwise occur if the net angular momentum were non-zero. This allows the pendulum mechanism to operate unaffected for traversing gentle, unchallenging terrain.

In an embodiment of the present invention the two CMGs are oriented such that their flywheel spin axes are parallel to a first vertical axis, and perpendicular to a second axis parallel to the main drive axle of the spherical vehicle. Two motors are attached to the pendulum, one for each CMG, effective for independently applying torque to the two CMG housings about a third axis perpendicular to both the first and second axes. Equal and opposite torques from the two motors can be applied to the CMG housings to tilt them in opposite directions with zero net torque on the pendulum about the third axis. By tilting the CMG housings relative to each other about the third axis, a component of the angular momentum of each CMG now contributes to a non-zero angular momentum about the second axis, which is parallel to the drive shaft of the spherical vehicle. Conservation of angular momentum requires that a torque is applied about the second axis for the momentum to change about that axis. As stated hereinabove, torque is related to angular momentum by the equation, $$\tau = \frac{dL}{dt}.$$

Since the CMGs are mounted to the pendulum, they apply a torque to the pendulum such that the pendulum applies a reaction torque to the CMGs to change the angular momentum. By tilting the CMGs in the appropriate directions the generated torque applied to the pendulum may be in the same direction that gravity applies torque to the pendulum, which in turn permits the drive motors to apply torque to the drive shaft and spherical shell. Since the torque that the CMGs apply to the pendulum is a function of the time rate of change of the angular momentum, this torque may be many times greater than the maximum torque possible with a pendulum mechanism utilizing gravitational forces only.

The angular momentum vectors of the CMGs start at initially 180° apart, and may each be tilted 90° towards each other until they are in the same direction, parallel to the drive shaft axis. Having attained this position, the net angular momentum of the two CMGs is at a maximum and equal to the sum of the individual magnitudes. Tilting the axes further than 90° again moves the vectors opposite to each other, which results in the net angular momentum decreasing to zero, which in turn results in torque on the pendulum in the opposite direction. For generating torque in the forward direction only, the effect of the CMGs is limited within the tilt angle range from 0° to 90°. Since torque is given by the time rate of change of angular momentum, increasing the maximum angular momentum of the CMGs increases the time over which the torque can be applied. Similarly, increasing the maximum angular momentum may also allow a greater torque to be applied over the same time period. Therefore, maximizing the angular momentum of the CMGs will maximize their usefulness.

Once the CMGs have been tilted 90°, no additional torque is available from the CMG pair which may be tilted back to their original condition in order for the CMGs to be utilized again. Torque on the pendulum due to gravity, which would normally be used to cause the sphere to roll backwards, may be used to assist in returning the angular momentum of the system to zero without applying torque to the drive shaft. This permits the CMGs to be reset to their net-zero angular momentum configuration with no undesirable torque applied to the spherical shell. That is, conservation of angular momentum requires a torque to decrease the angular momentum back to the net zero condition. While this may appear to undo their intended function, the CMGs may be slowly tilted, requiring less applied restoring torque, which may be entirely provided by gravity and the pendulum.

The present invention may be limited by the total amount of angular momentum that can be stored due to strength limits of flywheel materials. This limited momentum prevents the spherical vehicle from climbing an infinitely long, steep, and smooth incline. Natural terrain, however, often has a more irregular profile and may offer small shallow areas or obstacles for the sphere to stop temporarily while the CMGs are reset. In the event that the terrain is very loose, for instance sand dunes in the desert or on Mars, the spherical vehicle could reserve some momentum in the CMGs prior to depletion, that when released very quickly would cause the spherical shell to dig a small depression in the terrain for it to rest for resetting the CMGs. Increasing the stored angular momentum will increase the severity of the terrain that the sphere can negotiate. Sophisticated terrain sensing and mapping of a steep, long, irregular incline may allow the sphere to plot its trajectory between stable resting locations. The spherical vehicle may also be rolling at a chosen speed prior to encountering a steep incline, which may enable it to travel further up the incline before depleting the momentum in its CMGs the first time.

Stairs designed for human traffic have fairly standard nominal dimensions where the rise of a stair is less than the run. As will be described in the EXAMPLE, a spherical vehicle having a radius in between the nominal rise and run dimensions may be sufficiently small to rest on a nominal stair under no power, but large enough to have the traction on the corner of the next step, thereby allowing it to climb. Such a sphere size might need only to have sufficient stored momentum for climbing a single step since after each step, the vehicle may stably rest while resetting its CMGs. This procedure would allow the vehicle to climb any number of stairs in succession.

In order for the mechanical components and actuators comprising the spherical vehicle described herein to function in a useful manner, various sensors and controls may be included. Sensors for periodically or continuously determining the state of the system may include rotary encoders for measuring angular displacement and velocity of the actuators, angular rate sensors for measuring the angular velocity of the pendulum relative to an inertial reference frame, accelerometers for measuring acceleration of the pendulum and identifying the direction of gravity, and magnetometers to measure the direction of the Earth's magnetic field and compensate for angular rate sensor drift. Additional sensors such as cameras, radar, and global positioning system may be used for guidance and navigation purposes.

With the state of the system continuously measured, closed-loop feedback control may be used to robustly control the motion of the spherical vehicle. For example, the CMG flywheels may be controlled to spin at the same constant speed to ensure that the net-zero angular momentum condition is maintained when required. Further, the side-to-side motion of the pendulum when steering may be controlled to maintain a desired turning radius or to maintain straight forward motion when traversing uneven terrain. A suitable computer controller may be programmed to implement the control loops using the sensor data and appropriately command the actuators. The computer may also be programmed to utilize the CMGs only when necessary, avoiding a depletion of their angular momentum, and maintaining them in a condition ready for immediate use.

The present spherical vehicle may also be equipped with various single or bi-directional wireless communication devices for transmitting commands or data to the spherical vehicle, or transmitting telemetry data and/or video from the spherical vehicle. The spherical vehicle may be programmed for autonomously performing missions.

Reference will now be made in detail to the present embodiments of the invention, examples of which are illustrated in the accompanying drawings. In the FIGURES, similar structure will be identified using identical reference characters. Turning now to FIG. 1, a diagram of one embodiment of momentum storage using two, counter-rotating CMGs is presented. Rotating flywheel "a" of gyroscope, 10, is shown as having angular momentum $L_a$ about axis, 12, and rotating flywheel "b" of gyroscope, 14, is shown as having angular momentum $L_b$ about axis, 16. If gyroscopes 10 and 14 are identical and rotating at the same speed, but in opposite directions, when added together, the angular momentums $L_a$ and $L_b$ sum to a net angular momentum of zero. If tilting torques $\tau_{ta}$ and $\tau_{tb}$ are applied to the gyroscopes along a common y-axis, 18, equally and in opposite directions such that there is no net torque about y-axis 18, precession torques, $\tau_{pa}$ and $\tau_{pb}$ are generated. These precession torques add together in a direction appropriate for supplementing forward motion for sphere, 20. That is, as gyroscopes 10 and 14 are tilted in opposite directions about axis 18, angular momenta $L_a$ and $L_b$ are no longer parallel, but now have components along the x- and z-axes. The components along the z-axis remain equal and opposite, thereby cancelling. The component along the x-axis (the direction useful for supplementing forward motion of sphere 20), is related to the tilt angle as follows:

$$\tau_{px} = \tau_{tilt} \cos \theta_{tilt},$$

where $\tau_{px}$ is the component of the precession torque along the x-axis, $\tau_{tilt}$ is the sum of the magnitudes of the opposite tilt torques, and $\theta_{tilt}$ is the angle of tilt about the y-axis, 18, where in the orientation shown in FIG. 1, $\theta_{tilt}=0$. Therefore the CMGs generate the most useful torque when aligned as in FIG. 1, and decrease with the cosine to zero useful output at 90° tilt angle.

The relationship between the tilting torque and the tilt rate is given by:

$$\tau_{tilt} = L_{total} d\theta_{tilt}/dt,$$

where $L_{total}$ is the sum of the magnitudes of the angular momenta of gyroscopes 10 and 14, $L_a+L_b$. This equation shows that the greater the total angular momentum, the slower the flywheels will tilt for a given tilting torque, thereby allowing the flywheels to be utilized for a longer time period. Maximizing the angular momentum is beneficial since the CMGs are needed to produce a significant amount of torque for a time period sufficient to perform the intended maneuvers.

FIG. 2A is a schematic representation of a perspective view of one embodiment of the pendulum drive apparatus, 22, hereof, showing counter-rotating control moment gyroscopes 10 and 14. Gyroscopes 10 and 14 may include flywheels, 24, and 26, and spindles, 28, and 30, respectively. Motors, 32, and 34 (not shown in FIG. 2A) drive solid flywheels 24 and 26 through spindles 28 and 30, respectively. The term "gyroscope," when used herein, includes a drive motor even when not explicitly shown in a FIGURE. Tilting pulleys, 36, and 38, which rotate on collinear axles, 39a, and 39b, respectively (not shown in FIG. 2A), turn flywheel housings, 40, and 42, which are mounted thereon, respectively. Assuming that gyroscopes 10 and 14 have angular momenta having equal magnitude, the desired effect may be obtained by tilting the gyroscopes to equal, but opposite, angles in parallel planes or the same plane. Although this provides suitable propulsion in the forward and rearward directions, unequal tilt angles may be contemplated. Pulley, 44, driven by motor, 46, turns pulley 36 through belt, 48. Struts, 50, and 52, support pulleys 36 and 38, respectively, and pendulum base, 54, which supports batteries, vehicle control circuits, and motors, not shown in FIG. 2A. It should be mentioned that other embodiments of the present invention may include motors 46 and 86 as directly tilting gyroscopes 10 and 14, as well as hydraulic means or magnets for performing the tilting function (not shown in the FIGURES). Hanger, 56, rotatably supports pendulum drive apparatus 22 on main drive shaft, 58, by secondary shafts, 60a, and 60b. Miter gears, 62, and, 64 (not shown in FIG. 2A), mounted on pulleys, 66, and 68, which freely rotate on secondary shafts 60a and 60b, turn miter gear, 70, affixed to main drive shaft 58. Together miter gears 62, 64, and 70 form a differential drive or transmission for main drive shaft 58. Pulley, 72, driven by motor, 74, drives pulley 68, by means of belt, 76, with a similar arrangement for driving pulley 66 (pulley, 78, driven by motor, 80, not shown in FIG. 2A, drives pulley 66 by means of belt, 82). As stated hereinabove, main drive shaft 58 is connected to sphere 20 for driving and steering the spherical vehicle. It should be mentioned that none of the bearings generally used for rotating parts are illustrated in the present drawings. Additionally, although miter gears are shown throughout, bevel gears may be employed if a gear reduction is desired.

FIG. 2B is a schematic representation of front view of the pendulum drive shown in FIG. 2A hereof, illustrating one of the driving motors for the control moment gyroscopes, the pendulum swing and tilt motors, and the tilting motors for the control moment gyroscopes. Pulley, 84, driven by motor, 86, is shown driving pulley 38 by means of belt, 88.

Figure 2D:
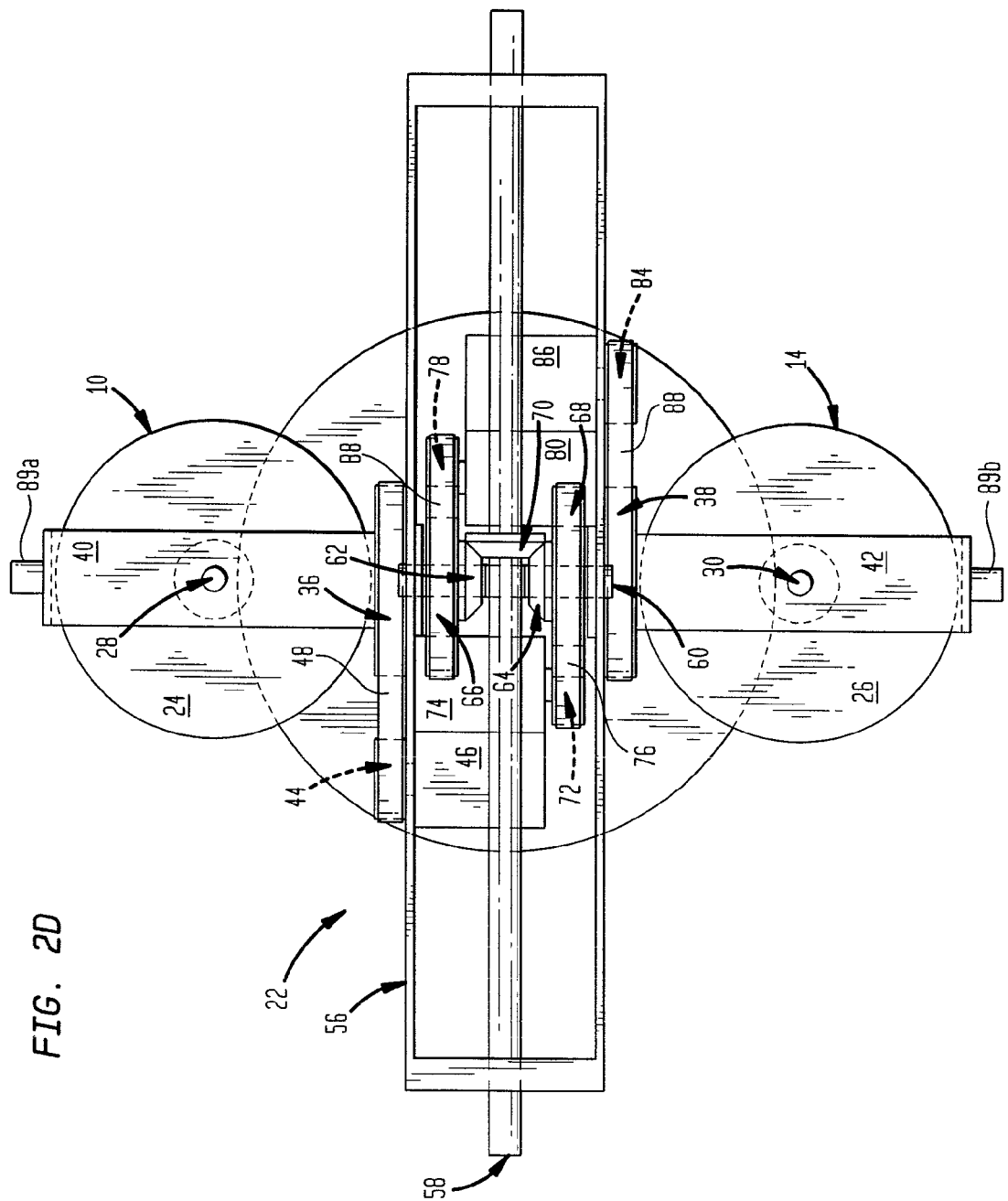
FIG. 2D is a schematic representation of a top view of the pendulum drive apparatus shown in FIG. 2A hereof, illustrating the twisting pulleys for the control moment gyroscopes, the pendulum drive pulleys, and the pendulum differential drive.

FIG. 2C is a schematic representation of a side view of the pendulum drive apparatus shown in FIG. 2A hereof, showing both drive motors for the control moment gyroscopes, the tilting pulleys therefore, and the miter gear differential drive for the pendulum. Collinear axles 39a and 39b are shown oriented perpendicular to main drive axle 58. FIG. 2D is a schematic representation of a top view of the pendulum drive apparatus shown in FIG. 2A hereof, illustrating the tilting pulleys for the control moment gyroscopes, the pendulum drive pulleys, and the pendulum differential drive. Axles 89a and 89b mounted to housings 40 and 42, respectively, permit housings 40 and 42 to be rotatably attached to supporting structure (not shown in FIG. 2D) for gyroscopes 10 and 14 for additional support if required.

Figure 3:
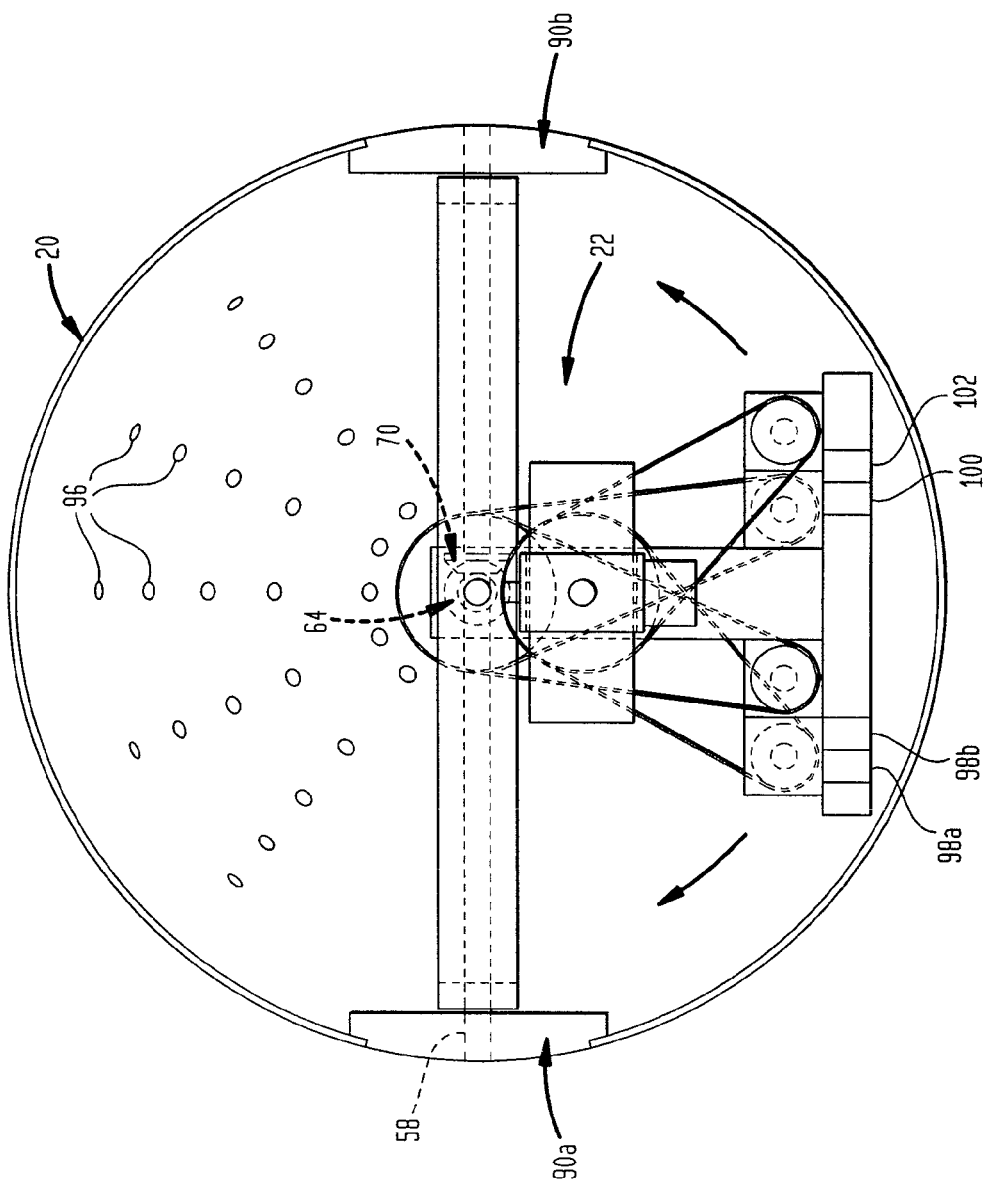
FIG. 3 is a schematic representation of a front view of an embodiment of the sphere into which the pendulum drive apparatus is inserted, illustrating the two hubs to which the main drive shaft is affixed.

FIG. 3 is a schematic representation of a front view of an embodiment of spherical shell 20 into which pendulum drive apparatus 22 is inserted, illustrating hubs, 90a, and 90b, which permitted the parts to be inserted and assembled, and which may be fastened to shell 20 using screws or other fastening means (not shown in FIG. 3). Main drive shaft 58 is affixed to hubs 90a and 90b. Pendulum drive means 22 is shown hanging from shaft 58, and cooperatively engaged therewith using miter gears 62, 64 and 70 as shown in FIG. 2A hereof. In the embodiment shown, the shell of the spherical vehicle provides the sole means of shock absorption for the vehicle, and provides traction for effectively climbing over obstacles. Rubber nubs, 96, were mounted on the exterior surface to provide increased traction. A random or patterned deployment may be used. A rubberized band or a reinforced rubber tread similar to a truck tire may be circumferentially attached to the outside surface of spherical shell 20 perpendicular to drive shaft 58 (not shown in FIG. 3) for permitting additional traction to be obtained while providing collision protection for the spherical vehicle. Forming shell 20 from materials from which treads may be fabricated is also anticipated. Minimizing the mass of the shell relative to the pendulum apparatus lowers the center-of-gravity, and improves acceleration of the vehicle.

In use, the pendulum assembly may rotate on the main drive shaft to drive the spherical vehicle forward and backward. It should be mentioned that the pendulum is not actually required to shift from the vertical to drive the shaft when using the gyroscopes. Another function of the pendulum is to steer the spherical vehicle in which situation the pendulum may tilt side-to-side, along the shaft. As stated hereinabove, one embodiment for enabling such motion utilizes a differential drive system including three engaged miter gears, the center one of which is fixed to the drive shaft, while the opposing gears are each independently driven and controlled by a motor. When the opposing miter gears are driven in opposite directions, torque is applied to the main drive shaft effective for driving the spherical vehicle, while when they are driven in the same direction, the pendulum is caused to tilt to the side, thereby enabling the sphere to be steered. The drive motor outputs are continuously variable between these two situations, permitting full proportional control of forward steering motion of the sphere.

Pendulum base contains battery packs, 98a, and 98b, and control circuitry, 100, and is designed to conform with the spherical interior shape of the spherical vehicle to best utilize space and to position the center-of-mass thereof as close to the interior surface as possible. Wireless transceiver(s), 102, will permit control signals to be received from an external source thereof, and data to be transmitted. The pendulum base may be disposed as close to the inner surface of the spherical shell as is practicable to achieve unrestricted movement of the pendulum(s), to maximize the torque generated by gravitational forces thereon.

Figure 4A:
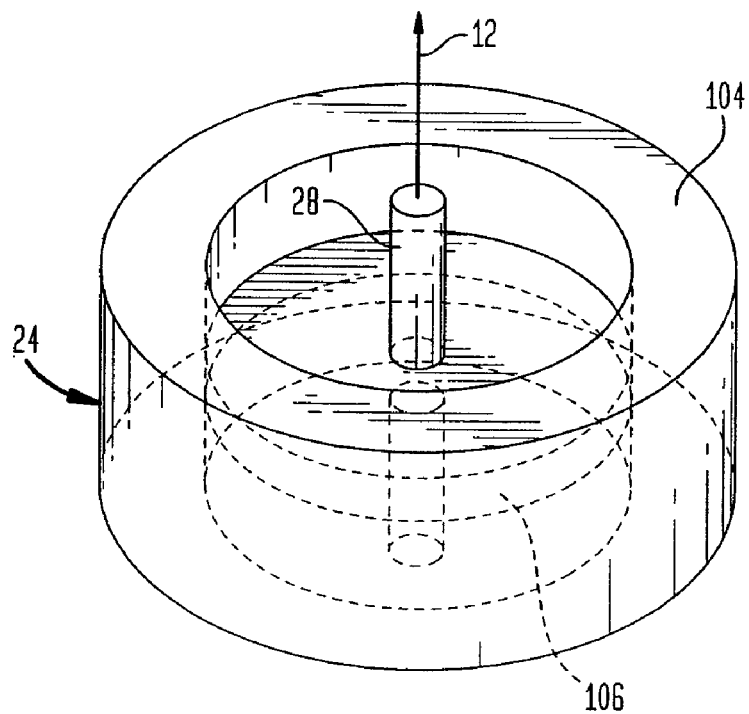
FIG. 4A is a schematic representation of a perspective view of an embodiment of a flywheel illustrating the distribution of mass around a thin ring supported by a web, attached to a spindle.
Figure 4B:
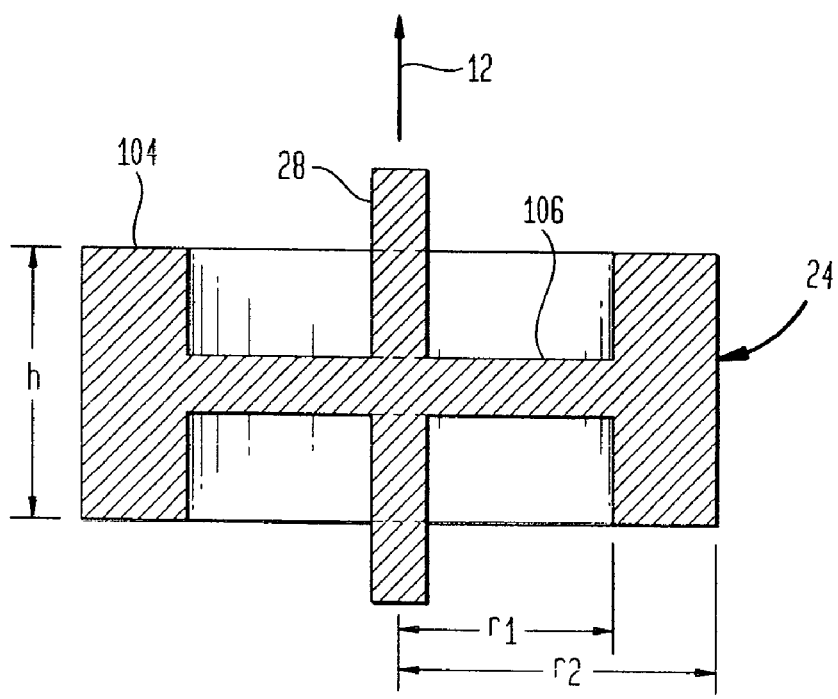
FIG. 4B is a schematic representation of the section view thereof.
Figure 4C:
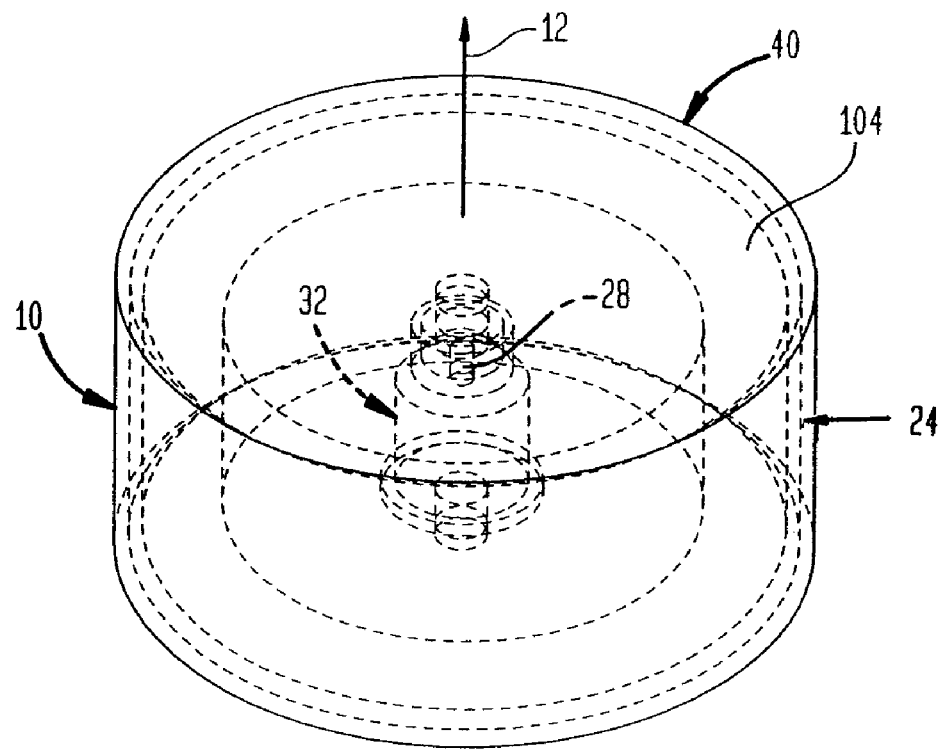
FIG. 4C is a schematic representation of a perspective view of another embodiment of a flywheel illustrating a flywheel having two web portions with the spindle being driven by motor which sits on a pedestal located inside the flywheel housing.
Figure 4D:
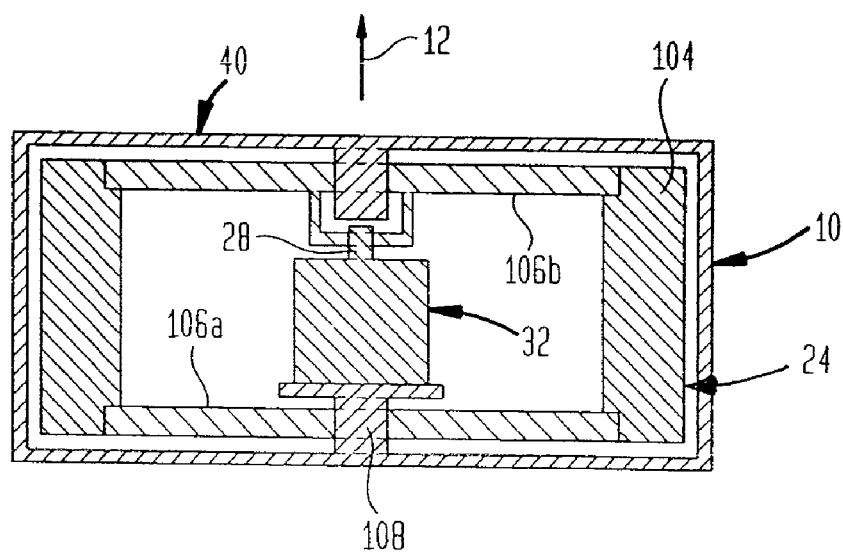
FIG. 4D is a section view thereof.

FIG. 4A is a schematic representation of a section view of an embodiment of flywheel 24 illustrating the distribution of mass around thin ring 104 supported by web, 106 attached to spindle 28 having axis 12, while FIG. 4B is a schematic representation of the section view thereof. FIG. 4C is a schematic representation of a perspective view of another embodiment of flywheel 24 having two removable web portions 106a and 106b, and wherein spindle 28 is driven by motor 32 which is disposed on pedestal, 108, inside housing 40, while FIG. 4D is a side view thereof.

As mentioned hereinabove, angular momentum is given by the product of the moment of inertia and angular velocity of the flywheel. Referring to FIGS. 4A-4D, hereof, to maximize the storage of angular momentum the moment of inertia of a spinning mass may be maximized by distributing the mass in a thin ring around the spin axis in accordance with:

$$I = \tfrac{1}{2}\pi\rho h(r_2^4 - r_1^4),$$

where ρ is the density, h is the thickness, $r_1$ is the inside radius and $r_2$ is the outside radius of the ring. Within the constraint of the spherical shell, the flywheels were designed to have as large a radius as would permit sufficient clearance for tilting the support structures therefor. Stainless steel was used since it is relatively dense, readily machinable, high in strength, and low in cost; however, other materials may be employed. Since the flywheels are tilted, the radial load on the support shafts (spindles, 28) is high. Therefore, suitable bearings were employed to support the flywheel shafts and to keep the flywheels properly located with low friction.

Figure 5:
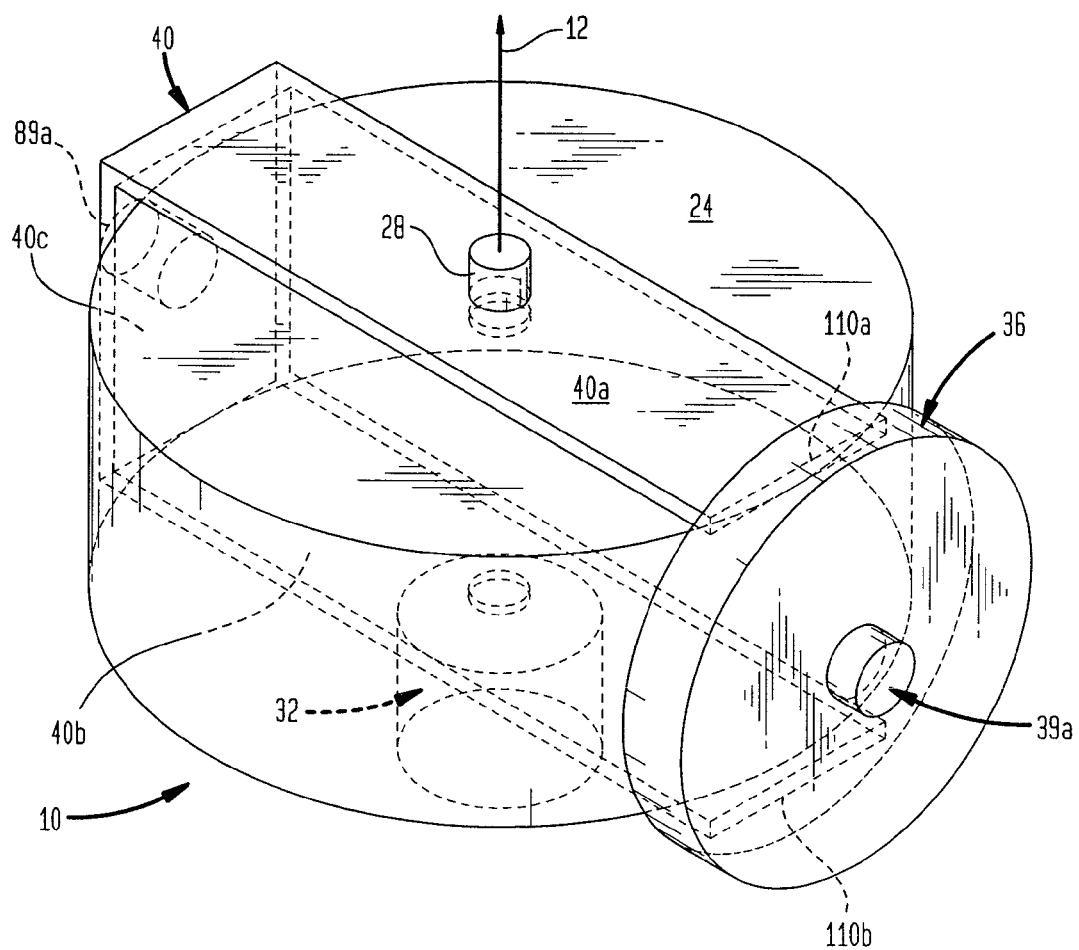
FIG. 5 is a schematic representation of a perspective cutaway view of the embodiment of the control moment gyroscope shown in FIG. 2A, hereof, illustrating a solid flywheel and single-axis tilting.

FIG. 5 is a schematic representation of a perspective cut-away view of the single-axis tilting embodiment of control moment gyroscope 10 shown in FIG. 2A, hereof, illustrating solid flywheel 24 rotating about spindle 28 and driven by motor 32 mounted in housing 40. Housing 40 is shown to include upper and lower plates, 40a, and 40b, respectively, connected by plate, 40c, and mounted on tilting pulley 36 at ends, 110a, and 110b, respectively which rotates on axis 39a.

Figure 6A:
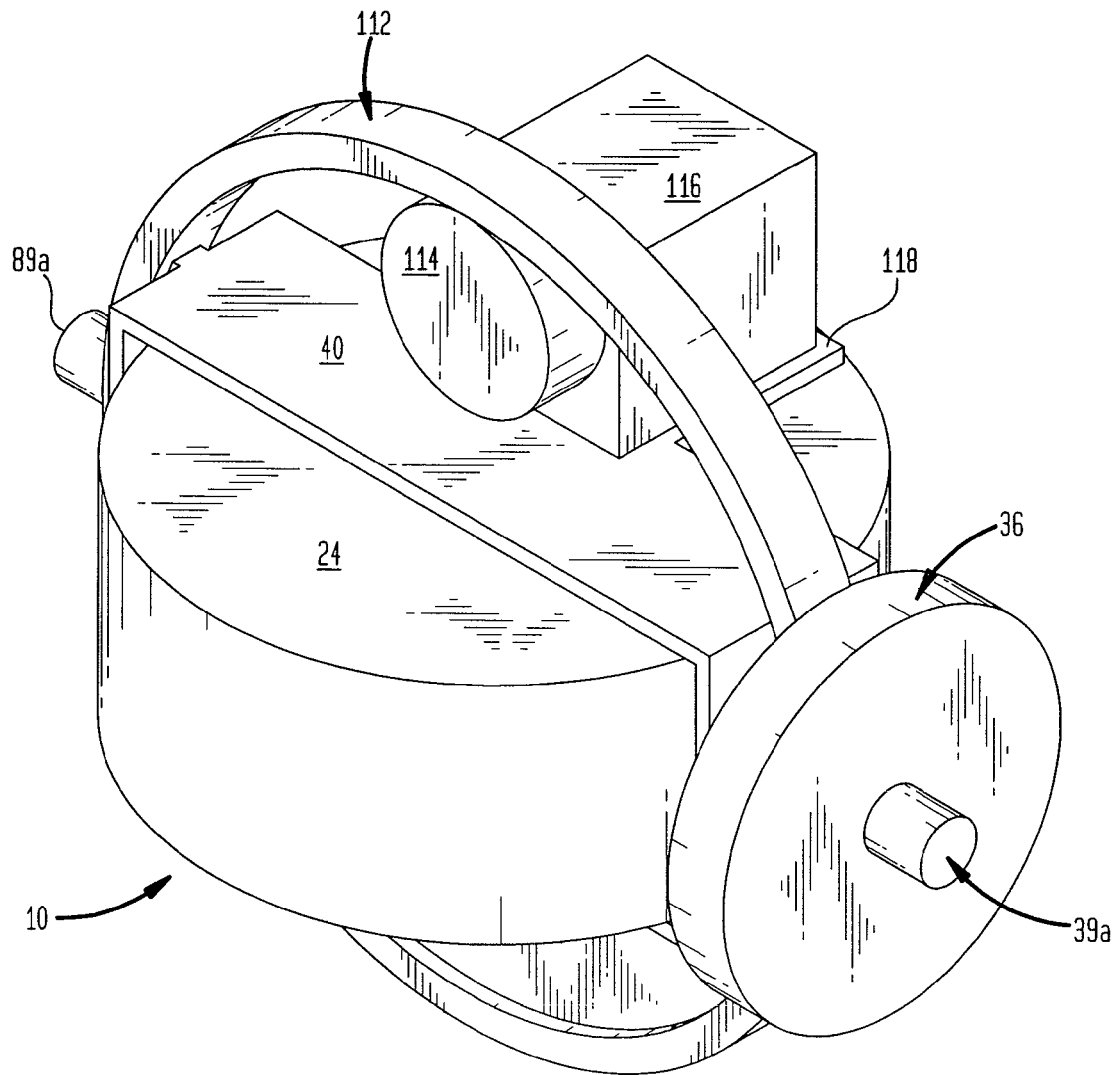

FIG. 6A is a schematic representation of a perspective view of another embodiment of control moment gyroscope 10, illustrating two-axis tilting. Solid flywheel 24 is shown rotating in housing 40 which rotates in support ring, 112, when driven by wheel, 114, powered by motor, 116, mounted on an extension, 118, of housing 40.

Figure 6B:
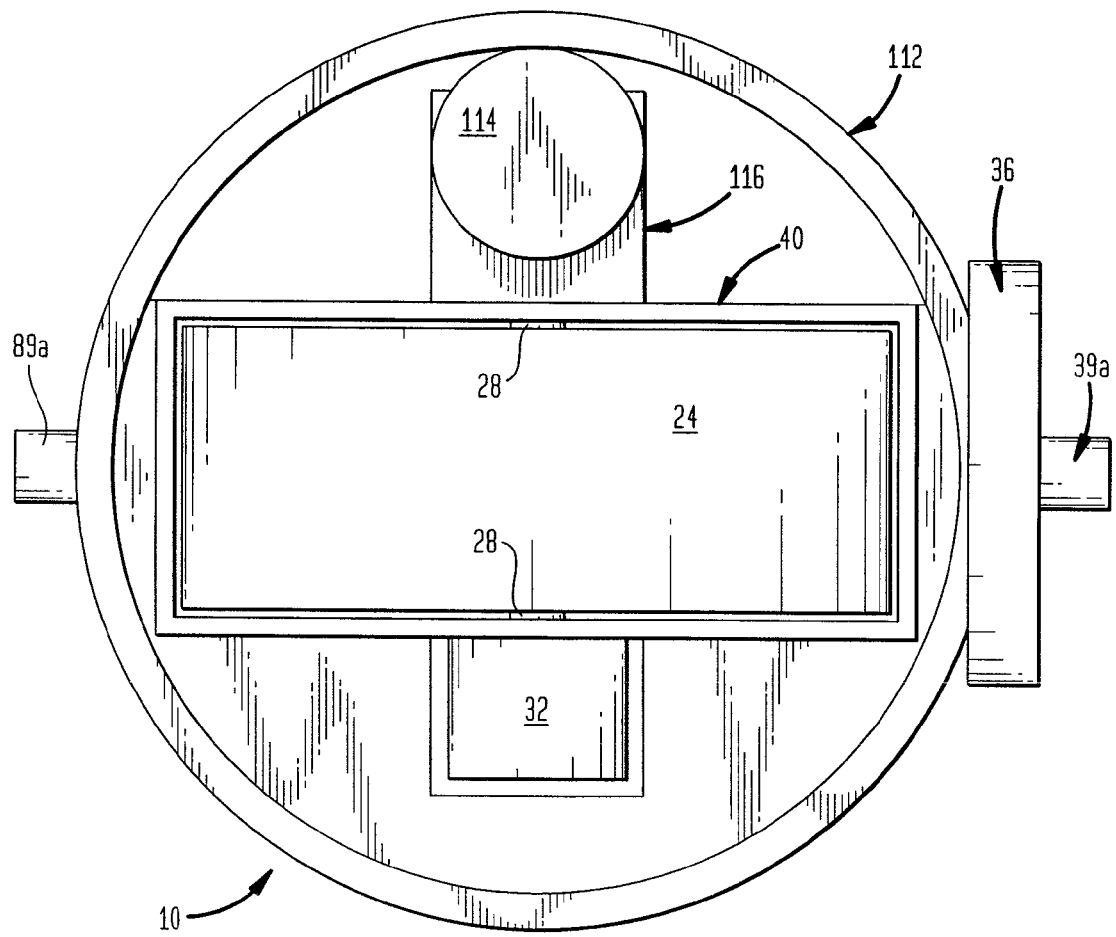
FIG. 6B is a schematic representation of a side view thereof.

FIG. 6B is a schematic representation of a side view of the embodiment of gyroscope 10 shown in FIG. 6A, hereof. In operation, two-axis tilting control moment gyroscope 10 would be used to augment the steering capability of the present spherical vehicle, currently described hereinabove as resulting from tilting the pendulum in a direction perpendicular to main drive axle 58.

Figure 7:
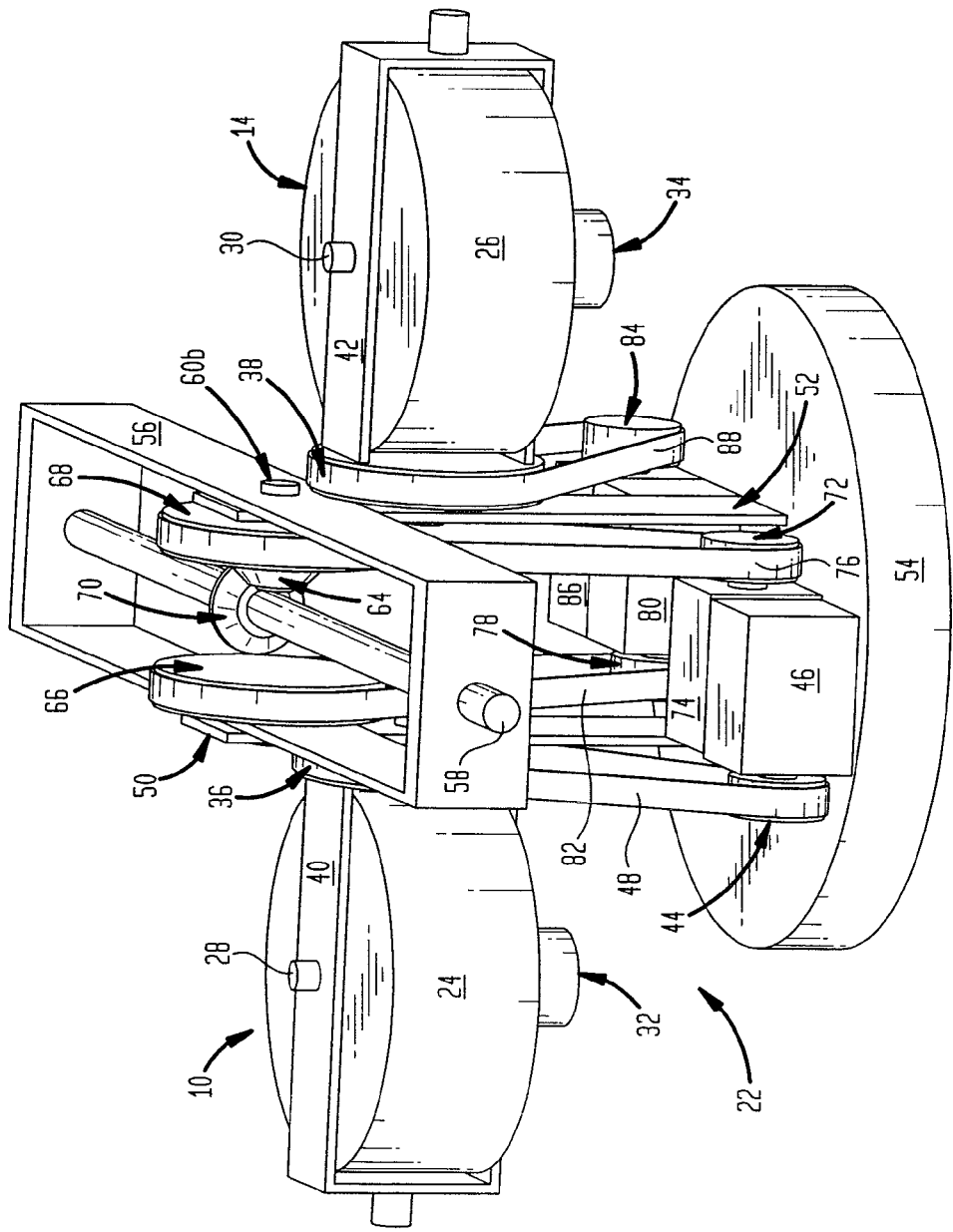
FIG. 7 is a schematic representation of a perspective view of a second embodiment of the pendulum drive hereof.

FIG. 7 is a schematic representation of a perspective view of a second embodiment of pendulum drive 22 hereof. Pulley 66 is directly attached to hanger 56 for rotating pendulum 22 about axles 60a (not shown in FIG. 7) and 60b to provide side-to-side tilting motion of pendulum 22 for steering the spherical vehicle, and is uncoupled from the transmission for driving the spherical shell forward and backward.

Figure 8A:
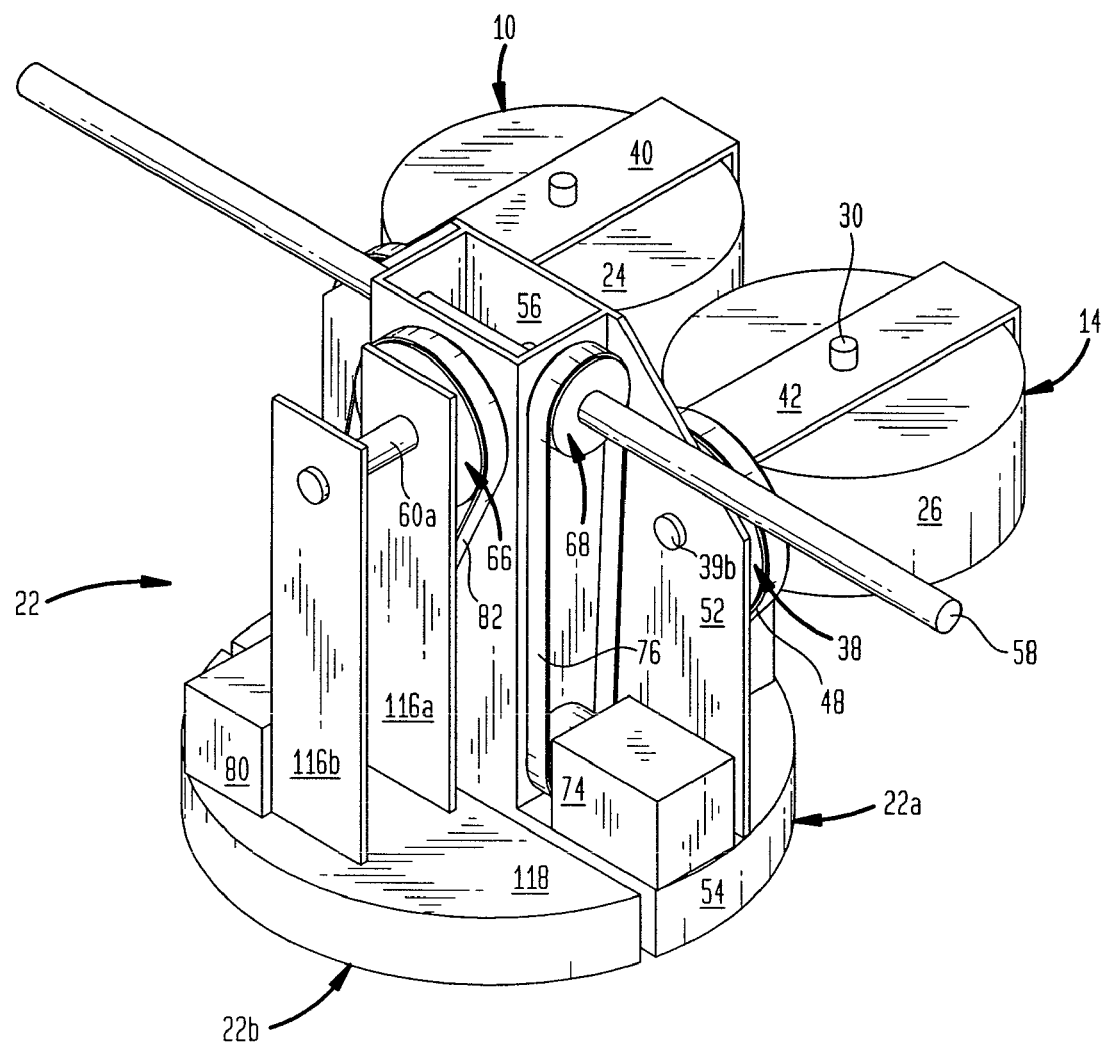
Figure 8B:
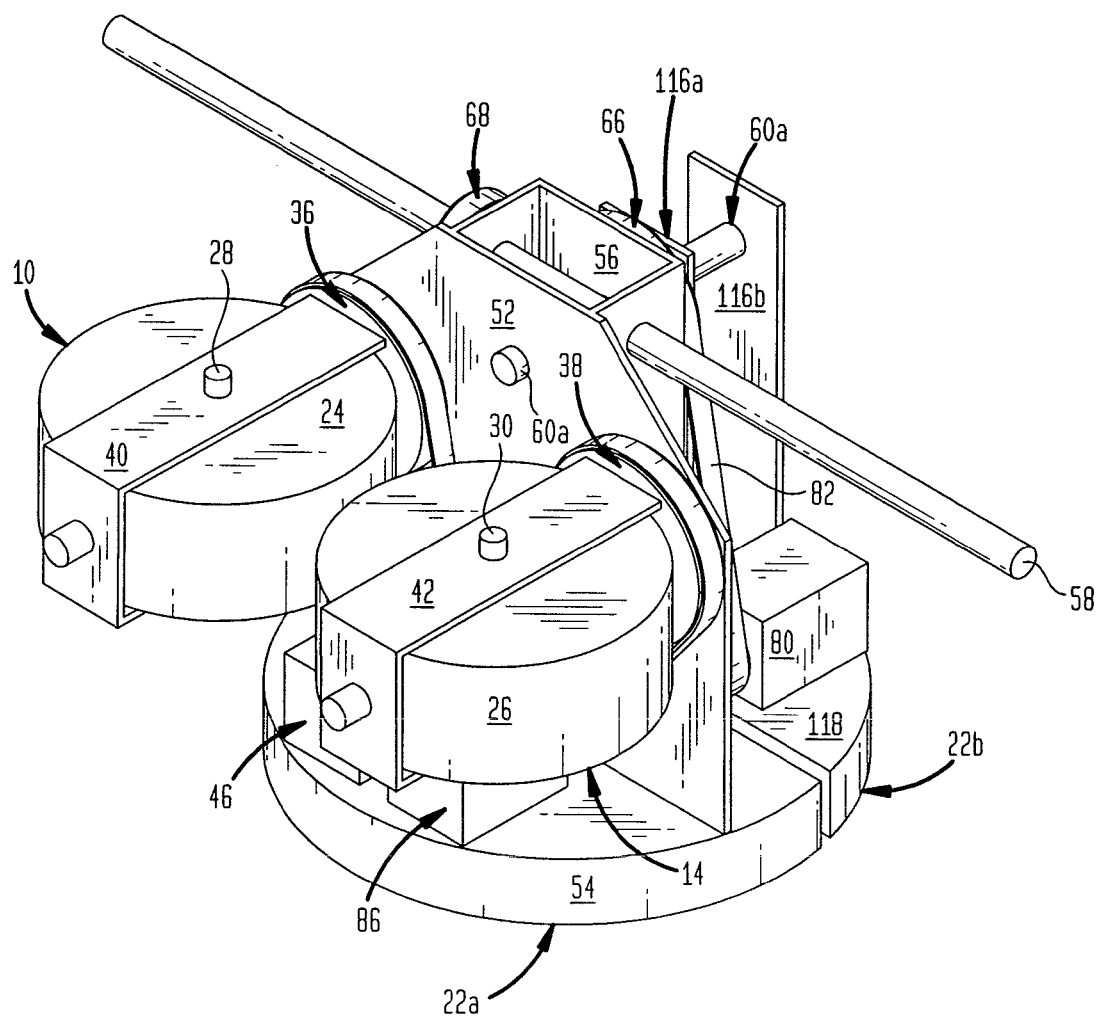
FIG. 8B is a schematic representation of the perspective view of the two pendulum drive shown in FIG. 8A hereof from the other side thereof.

FIG. 8A is a schematic representation of a perspective view of a two-pendulum embodiment of pendulum drive 22 hereof, illustrating the counter-rotating control moment gyroscopes 10 and 14, and pulley 68 for directly driving main drive axle 58, supported by hanger 56 on base 54 of pendulum, 22a, and pulley 66 for providing side-to-side tilting for pendulum 22b, around axle 60a supported by support members, 116a, and 116b, on base, 118, and by hanger 56, for steering the spherical vehicle. FIG. 8B is a schematic representation of the perspective view of the two pendulum drive shown in FIG. 8A hereof from the other side thereof.

Having generally described embodiments of the invention, the following EXAMPLE provides additional detail, but is not intended to in any way limit the scope if the invention:

EXAMPLE

According to the 2006 International Residential Code, stair steps have a maximum rise (height) of 7.75", and a minimum run (depth) of 10". Typical minimum staircase widths are 36". In order to enable a spherical vehicle to ascend stairs, spherical shells between about 16" and about 32" in diameter were investigated. A 16" diameter or larger sphere with effective tread can achieve sufficient traction to climb a step since its radius is larger than the maximum step height. A sphere having a 32" or smaller diameter has some maneuverability on the step since it is smaller than the nominal staircase width. Spherical vehicles having diameters less than 20" enable such vehicles to "rest" unpowered on a step of minimum depth, and make ascending a staircase one step at a time possible.

A spherical vehicle having a diameter of 18" was reduced to practice and shown to be capable of climbing a single step. This spherical vehicle had a radius, R, of 9", and the distance from the center of the sphere to the center of mass of the vehicle, r, was about 3", resulting in a ratio r/R of 1/3. The total weight of the spherical vehicle, including pendulum drive apparatus 22 was about 35 pounds. The flywheel in each of the two control momentum gyroscopes was about 5" in diameter and weighed about 5 pounds. Spinning at 10,000 rpm, the sum of the magnitudes of the angular momenta of the two control momentum gyroscopes was about 7.4 lb-ft-s, which was found to be sufficient to enable the spherical vehicle to climb one nominal step. The ability to ascend inclines has also been investigated. Since the height of a step is similar to the radius of the sphere, the torque required to ascend a step is similar to the torque required to ascend an incline approaching 90°.

To test the spherical vehicle, a radio-controlled helicopter transmitter and receiver were employed. Autonomous control and navigation may be added to increase the utility of the spherical vehicle.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A spherical vehicle comprising:
    a spherical shell;
    an axle connected to said shell and disposed interior thereto along a diameter;
    a pendulum pivotably coupled to said axle;
    a transmission for driving and tilting said pendulum, comprising a first drive motor cooperating with a second drive motor;
    a first gyroscope disposed on said pendulum;
    a second gyroscope disposed on said pendulum, said first gyroscope and said second gyroscope being effective for generating torque between said pendulum and said axle;
    a third motor for tilting said first gyroscope; and
    a fourth motor for tilting said second gyroscope.

2. The spherical vehicle of claim 1, wherein said first gyroscope and said second gyroscope have equal magnitudes of angular momentum, and are tilted in equal and opposite angles in parallel planes.

3. The spherical vehicle of claim 1, wherein said first gyroscope and said second gyroscope have equal magnitudes of angular momentum, and are tilted at equal angles in opposite directions in the same plane.

4. The spherical vehicle of claim 2, wherein said first gyroscope and said second gyroscope are tilted at equal angles in opposite directions about the same axis perpendicular to said axle.

5. The spherical vehicle of claim 1, wherein said transmission further comprises means whereby said first motor and said second motor rotate said pendulum about said axle and rotate said pendulum longitudinally to said axle.

6. The spherical vehicle of claim 5, wherein said pendulum rotation means comprises a first bevel gear driven by said first motor, a second bevel gear driven by said second motor, and a third bevel gear attached to said axle, said first bevel gear and said second bevel gear driving said third bevel gear.

7. The spherical vehicle of claim 6, wherein said first bevel gear, said second bevel gear, and said third bevel gear comprise miter gears.

8. The spherical vehicle of claim 7, wherein said first motor directly drives said first miter gear, and said second motor directly drives said second miter gear.

9. The spherical vehicle of claim 7, wherein said transmission further comprises a first pulley drive for driving said first miter gear and a second pulley drive for driving said second miter gear.

10. The spherical vehicle of claim 9, further comprising means for powering said first motor and said second motor, said first motor, said second motor, said means for powering said first motor and said second motor being disposed on said pendulum in the vicinity of the inner surface of said shell.

11. The spherical vehicle of claim 1 further comprising a second pendulum, wherein said transmission further comprises means whereby said first motor rotates said first pendulum about said axle and said second motor rotates said second pendulum longitudinally to said axle.

12. The spherical vehicle of claim 11, wherein said rotation means comprises a first bevel gear driven by said first motor, and a third bevel gear attached to said axle, said first bevel gear driving said third bevel gear.

13. The spherical vehicle of claim 12, wherein said first bevel gear and said third bevel gear comprise miter gears.

14. The spherical vehicle of claim 13, wherein said first motor drives said first miter gear directly, and said second motor directly rotates said pendulum longitudinally to said axle.

15. The spherical vehicle of claim 13, wherein said transmission further comprises a first pulley drive for driving said first miter gear and a second pulley drive for rotating said pendulum longitudinally to said axle.

16. The spherical vehicle of claim 15, further comprising means for powering said first motor and said second motor, said first motor, said second motor, said means for powering said first motor and said motor being disposed on said pendulum in the vicinity of the inner surface of said shell.

17. The spherical vehicle of claim 1, wherein said first gyroscope and said second gyroscope comprise gyroscopes capable of being tilted in two orthogonal directions.

18. The spherical vehicle of claim 17, further comprising a fifth motor for driving said first gyroscope in a second direction, and a sixth motor for driving said second gyroscope in a second direction.

* * * * *